United States Patent
Rawson

(10) Patent No.: US 6,814,872 B2
(45) Date of Patent: Nov. 9, 2004

(54) CONTROLLER AND METHOD FOR CONTROLLING REGENERATION OF A WATER SOFTENER

(75) Inventor: James Rulon Young Rawson, Clifton Park, NY (US)

(73) Assignee: General Electric Company, Niskayuna, NJ (US)

( * ) Notice: Subject to any disclaimer, the term of this patent is extended or adjusted under 35 U.S.C. 154(b) by 79 days.

(21) Appl. No.: 10/065,944

(22) Filed: Dec. 3, 2002

(65) Prior Publication Data

US 2004/0104175 A1 Jun. 3, 2004

(51) Int. Cl.[7] .......................................... B01D 35/143
(52) U.S. Cl. ...................... 210/662; 210/670; 210/739; 210/746; 210/143; 210/190
(58) Field of Search ................. 210/662, 670, 210/190, 739, 746, 143

(56) References Cited

U.S. PATENT DOCUMENTS 6,216,092 B1 * 4/2001 Kong ........................... 702/50

OTHER PUBLICATIONS

"Water Softener Operation: Anatomy and Operation of a Water Conditioner", Air & Water Quality,Inc. (www.aw-qinc.com/softener.html), 2 pages.

Rundle, Chris C.; "Beginners Guide to ISE Measurement," (www.nlco2000.net), May 5, 2000, Chapters 1–4.

"Standard Methods for the Examination of Water and Wastewater," Edited by L.S. Clesceri, A.E. Greenberg & R.R. Rhodes Truessell, 17th Edition, 1989, pp. 2–59–2–65.

* cited by examiner

Primary Examiner—Robert A. Hopkins
(74) Attorney, Agent, or Firm—David C. Goldman; Patrick K. Patnode

(57) ABSTRACT

Regeneration controller and method for controlling regeneration of a water softener are provided. The controller includes a water meter configured to output a signal indicative of the volume of influent water received by the water softener. A water-hardness indicator, such as a conductivity meter or ion-selective electrode, is configured to output a signal indicative of a degree of hardness of the influent water. A processor is coupled to receive the respective signals from the water meter and the hardness indicator. The processor is further configured to calculate a value indicative of the total level of hardness removed by the water softener. A comparator is coupled to receive a signal indicative of the quantity of resin capacity of the water softener. The comparator is further configured to receive the value indicative of total hardness to issue a regeneration command based on comparing the resin capacity relative to the value of total hardness.

14 Claims, 1 Drawing Sheet

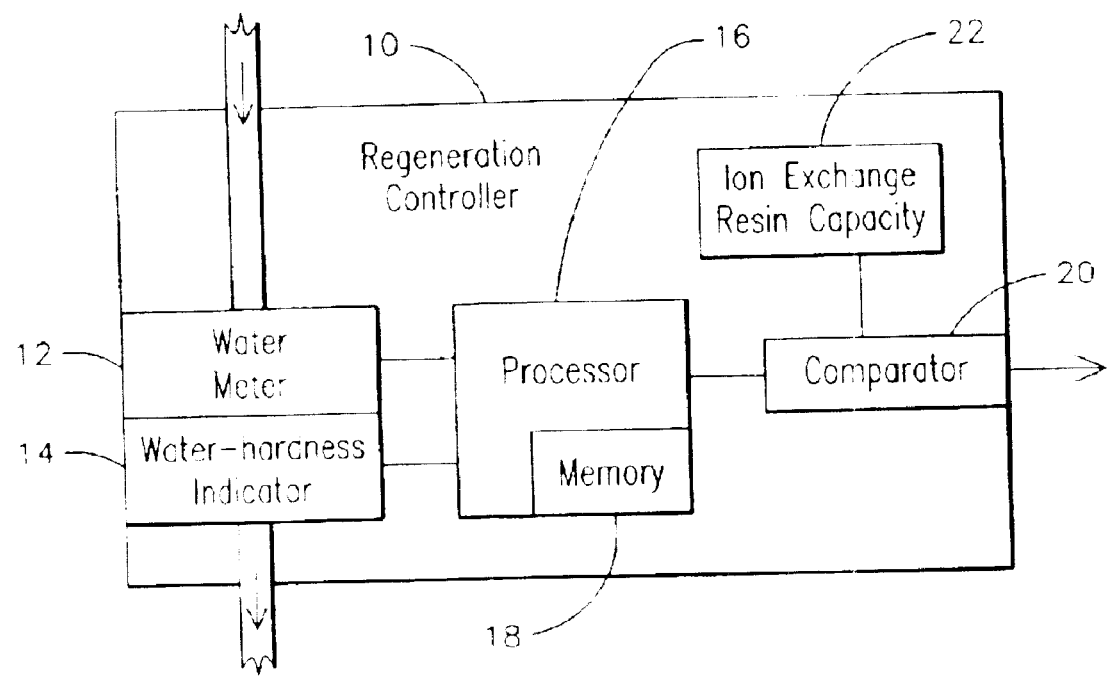

CONTROLLER AND METHOD FOR CONTROLLING REGENERATION OF A WATER SOFTENER

BACKGROUND OF INVENTION

The present invention is generally related to water softeners, and, more particularly, to a controller and method for controlling regeneration of a water softener based on the total hardness (e.g., concentration of calcium carbonate) removed from the influent water to the softener. Here, total hardness is defined as the hardness of the water times the total volume of water softened.

Municipal water treatment plants often draw water from several sources that vary in hardness. For example, when the source of the water is groundwater, the water can be relatively hard, which is equivalent to, for example, a high concentration of calcium carbonate. However, when the source of the water is surface water, the water can be relatively soft, such as characterized by a low concentration of calcium carbonate. Many municipal water treatment plants use both types of water in varying proportions. The proportion of hard and soft water used by a municipal water treatment plant may also vary over time. Therefore, the hardness of the water actually delivered to the consumer can vary considerably throughout the year. Many consumers use water softeners to soften the water used in their homes, the work place, schools, etc. These water softeners are typically preset to soften water of a predefined degree of hardness. The presetting action assumes that the predefined hardness of the influent water to the softener remains constant.

Thus, in the past, it has been assumed that the hardness of the influent water to the water softener remained constant. Further, it is believed that the only variable that water softeners have been known to measure is the volume of water treated by the softener. Hence, if the water hardness varied, the softener would undesirably regenerate prematurely or not often enough.

In view of the foregoing considerations it would be desirable to provide a water softener and techniques that permit measuring the variability of the hardness of the water over time. It would be further desirable to provide a water softener with a regeneration controller programmed to regenerate the softener based on the total hardness removed from the influent water, as opposed to based on an assumption likely to incorrectly reflect the actual composition of the water. It would be further desirable to provide a regeneration technique that avoids any unnecessary discharge of salt (e.g., brine) to the surrounding environment.

SUMMARY OF INVENTION

Generally, the present invention fulfills the foregoing needs by providing in one aspect thereof, a regeneration controller for a water softener comprising a water meter configured to output a signal indicative of the volume of influent water received by the water softener. A water-hardness indicator, such as a conductivity meter or an ion-selective electrode, is configured to output a signal indicative of a degree of water hardness of the influent water, such as may be indicated by a conductivity measurement or a calcium concentration measurement, respectively. A processor is coupled to receive the respective signals from the water meter and the water-hardness indicator. The processor is further configured to calculate a value indicative of the total level of hardness removed by the water softener. A comparator is coupled to receive a signal indicative of the quantity of resin capacity of the water softener. The comparator is further configured to receive the value indicative of total hardness to issue a regeneration command based on comparing the resin capacity relative to the value of total hardness.

In another aspect thereof, the present invention further fulfills the foregoing needs by providing a method for controlling regeneration of a water softener. The method allows measuring the volume of influent water received by the water softener. The method further allows measuring a signal indicative of a degree of hardness of the influent water, such as by measuring the degree of conductivity of the water, or the concentration of calcium in the water. A value indicative of the total quantity of hardness removed by the water softener is calculated. The resin capacity of the water softener is provided, e.g., is known. The resin capacity is related to the value of total hardness to determine whether or not regeneration is to be commanded for the water softener.

BRIEF DESCRIPTION OF DRAWINGS

The features and advantages of the present invention will become apparent from the following detailed description of the invention when read with the accompanying drawing in which:

FIG. 1 is a block diagram of an exemplary regeneration controller that, in accordance with aspects of the present invention, may be configured to issue a command to regenerate the softener based on the total hardness actually removed from the influent water.

DETAILED DESCRIPTION

Below is generic background information solely for the purpose of providing a cursory description of one exemplary operation of a typical water softener. This background information in no way should be construed as limiting the scope of the present invention described further below. A water conditioner may comprise at least two tanks a resin tank and a brine (e.g., salt) tank. The resin tank is filled with a resin that, for example, comprises relatively small beads of cross-linked polystyrene sulfonic acid. This resin may be referred to in the art as a cation resin. The beads may be constructed to exhibit a permanent electrical charge. The charge may cause the beads to attract positively charged ions. For example, the resin may be initially placed into service with $Na^+$ ions on the beads. When the hardness ions (e.g., $Ca^{2+}$ and $Mg^{2+}$) come in contact with the $Na^+$, such ions would displace the $Na^+$ on the beads. The $Na^+$ is eventually dissolved into the water. This sodium generally leaves the resin tank and may be delivered to the tap with the treated water. In theory, when most of the $Na^+$ is removed from the resin beads, regeneration equipment should start the regeneration process. As explained in the background section of the present specification, prior to the present invention, in practice, the regeneration process could be started regardless of whether or not regeneration is actually needed. The equipment may temporarily allow raw water (e.g., untreated water) to pass to the house during regeneration. This action may be done so as to avoid salt used during regeneration to enter the plumbing of the site. The resin may then be regenerated by drawing in a relatively high concentration of salt (e.g., NaCl, KCl) solution from the brine tank. This salt solution is washed over the depleted resin. The salt solution may contain $Na^+$ and $Cl^-$ ions. The Na is placed back onto the resin beads and the $Ca^{2+}$, $Mg^{2+}$ and $Cl^-$ are washed down the drain. The resin may then be rinsed with fresh water to remove any remaining residual salt. Additional water may be added to the brine tank to dissolve salt for the next regeneration cycle. The equipment may then command a service mode and there would be treated water available from the softener.

The inventor of the present invention has innovatively recognized that in order to optimize the benefits of a water softener, including appropriate brine usage for regeneration, it would be advantageous to regenerate the softener just when the ion exchange resin of the softener has actually been exhausted. The ion exchange resin of the softener should preferably be regenerated, when the hardness removed from the influent water equals the resin capacity (e.g., total mass of hardness or grains of hardness). The loading of the ion exchange resin is a function of the water hardness (e.g., grains per gallon) times the volume of the water (gallons).

FIG. 1 is a block diagram of an exemplary regeneration controller 10 configured to issue a command to regenerate the softener based on the total hardness removed from the influent water. As shown in FIG. 1, controller 10 includes a water meter 12 for supplying a signal indicative of the volume of influent water to the water softener. Controller 10 further includes a water-hardness indicator 14 configured to output a signal indicative of a degree of the water hardness of the influent water. In one exemplary embodiment, the water hardness indicator comprises a conductivity meter configured to measure the conductivity (e.g., microsiemens) of the influent water. In another exemplary embodiment, the water-hardness indicator comprises an ion-selective electrode configured, for example, to measure the concentration (e.g., mg/L) of calcium of the influent water to the softener. Although FIG. 1 illustrates water meter 12 to be upstream relative to water-hardness indicator 14, it will be appreciated that the specific placement of the water meter relative to the water-hardness indicator is of no consequence for purposes of the present invention, and, accordingly, the specific block placement shown in FIG. 1 should not be construed as limiting the invention. Examples of conductivity meters that may be used include conductivity meter, Model No. Sension 5, available from Hach Company, Model No. 3100, available from YSI Incorporated, Model No. 130A, available from Thermo Orion. Examples of ion-selective electrodes that may be used for measuring calcium concentration include Model Nos. A27504-06 and A-27504-34 available from Cole-Parmer.

Since the conductivity of the influent water is a function of the total dissolved solids in the water, the conductivity of the water comprises an indication or suggests an approximate measure of the hardness of the water. Accordingly, in one exemplary embodiment a processor 16 may include a memory 18 for storing a functional relationship or a look-up table for relating the degree of conductivity of the influent water as may be measured by a conductivity meter to a degree of hardness (grains/gallon) of the influent water to the softener. In another exemplary embodiment, memory 18 may be configured for storing a functional relationship or a look-up table for relating the degree of calcium ion concentration, as may be measured by an ion-selective electrode to a degree of hardness of the influent water. In each case, such a relationship or look-up table may be experimentally and/or analytically derived using techniques well understood by those skilled in the art.

For readers desirous of general background information regarding the physical basis for relating the water conductivity and water hardness, reference is made to textbook titled "Standard Methods for the Examination of Water and Wastewater," edited by L. S. Clesceri, A. E. Greenberg & R. R. Rhodes Truessell, $17^{th}$ Edition, 1989, and, more specifically, see table 2510:1, page 2–60 for an illustration for relating concentration of potassium chloride to conductivity measurements.

In one exemplary embodiment, the degree of hardness can be calculated as follows: Divide concentration (molarity) of potassium chloride by 2=concentration of calcium (molarity). Multiply the concentration of calcium (molarity) by 40 gm/mole=concentration of calcium (gm/L). Multiply the concentration of calcium (gm/L) by 2.5=concentration of hardness (gm/L) or $CaCO_3$. Grains of hardness (grains/gal)= concentration of hardness (gm/L) as $CaCO_3$ divided by 0.0171 gm/L $CaCO_3$ per grain hardness per gallon.

Processor 16 is further configured to monitor the total volume (e.g., gallons) of water softened by the softener based on the signal supplied by water meter 12. The total hardness (grains) removed by the softener may be readily calculated by processor 16 by multiplying the degree of hardness (e.g., grains/gallon calculated using the functional relationship or look-up table stored in the memory of processor 16) of the influent water times the volume of water treated by the softener (e.g., gallons measured by water meter 12). Total Hardness (e.g., grains)=Hardness (e.g., grains/gallon)×Volume of Water Softened (e.g., gallons). A comparator 20 receives the measurement of total hardness calculated by processor 16. Comparator 20 further receives a signal 22 indicative of the ion exchange resin capacity of the respective water softener. The value of this capacity, for example, may be obtained from the specifications of the exchange resin, or may be estimated based on the particular characteristics, such as electrochemical and physical characteristics, of the specific exchange resin in the respective water softener. As suggested above, when the total hardness (e.g., grains) equals (e.g., grains) of the ion exchange resin for the given water softener, the softener will be commanded to regenerate itself in response to a regeneration command issued by regeneration controller 10.

As suggested above, aspects of the present invention innovatively allow measuring the total water hardness treated or removed by a water softener. This is accomplished by measuring both the degree of hardness (grains/gallon) of the influent water and the volume of influent water treated by the softener.

In operation, regeneration controller 10 allows to selectively regenerate the water softener, when the capacity of the ion exchange resin equals the total hardness removed from the influent water. This is expected to advantageously reduce the quantity of salt used to regenerate the softener and, therefore, the quantity of brine discarded to the surrounding environment, e.g., either a sewer or a septic tank.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A regeneration controller for water softener comprising:

a water meter configured to output a signal indicative of the volume of influent water received by the water softener;

a waxer-hardness indicator configured to output a signal indicative of a degree of hardness of the influent water, wherein the water-hardness indicator comprises an ion-selective electrode configured to measure degree of calcium ion concentration in the influent water;

a processor coupled to receive the respective signals from the water meter and the water-hardness indicator, the processor being configured to compute a value indicative of the total level of hardness removed by the water softener; and a comparator coupled to receive a signal indicative of the capacity of the resin in the water softener, the comparator further configured to receive the value indicative of total hardness to issue a regeneration command based on comparing the resin capacity relative to the value of total hardness.

2. The regeneration controller of claim 1 wherein the water-hardness indicator comprises a conductivity meter configured to measure a degree of conductivity of the influent water.

3. The regeneration controller of claim 2 further comprising memory for storing a functional relationship for relating the degree of conductivity measured by the conductivity meter to degree of hardness of the influent water.

4. The regeneration controller of claim 2 further comprising a look-up table for relating the degree of conductivity measured by the conductivity meter to a degree of hardness of the influent water.

5. The regeneration controller of claim 1 further comprising memory for storing a functional relationship for relating the degree of calcium ion concentration measured by the ion-selective electrode to a degree of hardness of the influent water.

6. The regeneration controller of claim 1 further comprising a look-up table for relating the degree of calcium ion concentration measured by the ion-selective electrode to a degree of hardness of the influent water.

7. The regeneration controller of claim 1 wherein the total level of hardness removed by the water softener is calculated based on the product of the volume of influent water by the degree of hardness of the influent water.

8. The regeneration controller of claim 1 wherein the comparator is configured to generate the regeneration command when the total level of hardness computed by the processor is equal to the level of resin capacity of the water softener.

9. A method for controlling regeneration of a water softener, the method comprising:

measuring the volume of influent water received by the water softener;

measuring a signal indicative of degree of hardness of the influent water, wherein the signal comprises a measurement of calcium concentration in the influent water;

calculating a value indicative of the total level of hardness removed by the water softener;

providing the quantity of resin capacity of the water softener; and relating the quantity of resin capacity to the value of total hardness to determine whether or not regeneration is to be commanded for the water softener.

10. The control method of claim 9 wherein the signal indicative of the degree of hardness of the influent water comprises a measurement of a degree of conductivity of the influent water.

11. The control method of claim 9 further comprising relating the measured degree of conductivity degree of hardness of the influent water.

12. The control method of claim 9 further comprising relating the measured degree of calcium concentration to a degree of hardness of the influent water.

13. The control method of claim 9 wherein the total level of hardness removed by the water softener is calculated based on multiplying the volume of influent water times the degree of hardness of the influent water.

14. The control method of claim 9 wherein the regeneration command is issued when the calculated total level of hardness is equal to the resin capacity of the water softener.

\* \* \* \* \*

UNITED STATES PATENT AND TRADEMARK OFFICE
CERTIFICATE OF CORRECTION

PATENT NO. : 6,814,872 B2
DATED : November 9, 2004
INVENTOR(S) : Rawson

It is certified that error appears in the above-identified patent and that said Letters Patent is hereby corrected as shown below:

Column 4,
Line 66, delete "waxer-hardness" and substitute -- water-hardness --.

Column 5,
Line 2, after "measure" insert -- a --.
Line 22, after "to" insert -- a --.

Column 6,
Line 26, after "conductivity" insert -- a --.

Signed and Sealed this

Seventeenth Day of May, 2005

JON W. DUDAS
*Director of the United States Patent and Trademark Office*